(12) United States Patent
Wetterlund

(10) Patent No.: US 6,722,290 B2
(45) Date of Patent: Apr. 20, 2004

(54) DEVICE FOR DETACHABLE MOUNTING OF A TABLE

(75) Inventor: Ulf Wetterlund, Edet (SE)

(73) Assignee: Volvo Personvagnar AB, Gothenburg (SE)

( * ) Notice: Subject to any disclaimer, the term of this patent is extended or adjusted under 35 U.S.C. 154(b) by 0 days.

(21) Appl. No.: 10/064,319

(22) Filed: Jul. 2, 2002

(65) Prior Publication Data

US 2003/0000431 A1 Jan. 2, 2003

Related U.S. Application Data

(63) Continuation of application No. PCT/SE00/02679, filed on Dec. 27, 2000, now abandoned.

(51) Int. Cl.⁷ ............................................. A47B 23/00
(52) U.S. Cl. ............................................. 108/44
(58) Field of Search ........................... 108/44, 45, 46; 224/400

(56) References Cited

U.S. PATENT DOCUMENTS

| | | | | |
|---|---|---|---|---|
| 2,214,575 | A | * | 9/1940 | Cercownay |
| 2,228,203 | A | * | 1/1941 | De Hoffmann |
| 2,867,471 | A | * | 1/1959 | Coon, Jr. |
| 3,896,742 | A | * | 7/1975 | Ferraro |
| 4,452,151 | A | * | 6/1984 | Jarrard |
| 4,455,948 | A | | 6/1984 | Torres |
| 4,494,465 | A | | 1/1985 | Fick |
| 4,770,155 | A | * | 9/1988 | Chamberlain et al. |
| 5,427,033 | A | | 6/1995 | Bly |
| 5,575,521 | A | * | 11/1996 | Speis |
| 5,730,066 | A | | 3/1998 | Auten et al. |
| 5,771,815 | A | * | 6/1998 | Leftwich |
| 6,095,059 | A | * | 8/2000 | Riley |
| 6,189,458 | B1 | * | 2/2001 | Rivera |
| 6,314,891 | B1 | * | 11/2001 | Larson |

FOREIGN PATENT DOCUMENTS

| | | | |
|---|---|---|---|
| AU | 221421 | * | 11/1956 |
| DE | 29910146 U1 | | 11/1999 |

* cited by examiner

*Primary Examiner*—Jose V. Chen
(74) *Attorney, Agent, or Firm*—Fitch, Even, Tabin & Flannery

(57) ABSTRACT

An arrangement for detachable mounting of a table on a vehicle is disclosed. The arrangement includes a supporting element arranged for locking to the table and a first locking element arranged in the supporting element for locking the supporting element to the vehicle. The supporting element, by the use of the first locking element, is arranged for fastening to a second locking element designed in the vehicle whereby the supporting element and the first locking element solely carries the table. This provides an enhanced arrangement for stable and simple mounting of a table to a vehicle.

13 Claims, 4 Drawing Sheets

DEVICE FOR DETACHABLE MOUNTING OF A TABLE

CROSS REFERENCE TO RELATED APPLICATIONS

The present application is a continuation of International Application No. PCT/SE00/02679, filed Dec. 27, 2000 and published in English pursuant to PCT Article 21(2), now abandoned and which claims priority to Swedish Application No. 0000027-3, filed Jan. 7, 2000. Both applications are expressly incorporated herein by reference in their entireties.

BACKGROUND OF INVENTION

1. Technical Field

The present invention relates to an arrangement for detachable mounting of a table. More particularly, the invention related to a detachable table mounting for use in a vehicle. The invention includes a supporting element arranged for being locked to the table, and a locking element arranged in the supporting element for locking the supporting element to the vehicle.

2. Background Art

With reference to motor vehicles such as cars, there is a need of being able to mount different kinds of tables, work benches and similar to the vehicle.

A detachable mountable table is particularly suitable to be used in connection with cars of the estate car type, and may then be used as a serving table for food and beverages after having been mounted to the boot of the car when the rear boot lid of the car is in its raised position. Then the table can be arranged to be firmly anchored in the vehicle and to protrude a little bit behind the car. Thus, for example, a number of chairs may be placed along the table when it is to be used.

From U.S. Pat. No. 5,730,066, a portable, collapsible table for mounting to a vehicle is known. More precisely, the table is intended to be mounted in connection with the vehicle boot when its boot lid is open. For this purpose the table is designed with a locking mechanism with a peg that is arranged to be put through a shackle available in the car normally used for locking of said boot lid. In that way the table may be locked to the vehicle. This known table is also designed with two legs that in the mounted and locked state of the table rests on the ground and in that way carries the weight of the table.

A disadvantage with the arrangement according to U.S. Pat. No. 5,730,066 is that it is assumed that the vehicle of current interest is placed on a firm and smooth foundation in order to permit the two legs resting on the ground to carry the table in a correct manner. As the design comprises two legs resting on the ground there is also a risk that the legs are soiled if the vehicle for example is parked on a muddy or wet foundation. The known design is also relatively complex in its design when it besides a tabletop also comprises two folding out legs. One more disadvantage is that its locking mechanism is not firmly anchored to the shackle of the vehicle, which may result in a certain instability for the table.

SUMMARY OF INVENTION

A main purpose of the present invention is to provide an enhanced arrangement for detachable mounting of a table in a vehicle, at which above-mentioned problem is solved. The purpose is achieved by arranging a first locking element so that it is detachably locked to a second locking element designed in the vehicle, whereby the supporting element and the first locking element solely carries said table.

The invention consists of an arrangement for detachable mounting of a table at a vehicle, comprising a supporting element arranged to be locked to said table and a first locking element arranged in the supporting element for locking the supporting element to the vehicle. The invention is characterized in that the supporting element by means of the first locking element is arranged for fastening to a second locking element designed in the vehicle whereby the supporting element and the first locking element solely carries said table.

By means of the invention a number of advantages are obtained. Foremost it is to be noted that the arrangement according to the invention constitutes a very simple and robust design with a low number of parts and which is mounted (and dismounted) in a quick and simple manner with reference to a vehicle. As said supporting element together with the first locking element solely carries the table a solution is acquired that does not require for example any extra legs that must be mounted to be resting on the ground. This also contributes to the simple design of the invention. By means of the design of the invention it is also simple to stow in for example a space beneath a floor in a boot in the vehicle in question.

One additional purpose of the invention is to provide an arrangement for detachable mounting of a table at a vehicle, at which a locking device available in the vehicle is used for the mounting of the table. This is achieved as said second locking element consists of a shackle available in the vehicle used for locking of a door or lid belonging to the vehicle.

One additional purpose of the invention is to provide a robust table design which is not experienced as unstable. This is achieved by designing said supporting element as a principally tubular leg with a longitudinal slot that during mounting is fitted around the shackle, after which the leg is locked to the shackle with said first locking element.

With the term "detachable mounted table" used in the following not only planar tables and tables tops for serving of for example food and beverages are concerned, but also other types of work benches, holders for work pieces and tools, as well as similar table designs.

BRIEF DESCRIPTION OF DRAWINGS

The invention is to be closer explained in the following with reference to a preferred embodiment and the drawings attached, in which.

DETAILED DESCRIPTION

Figure 1:
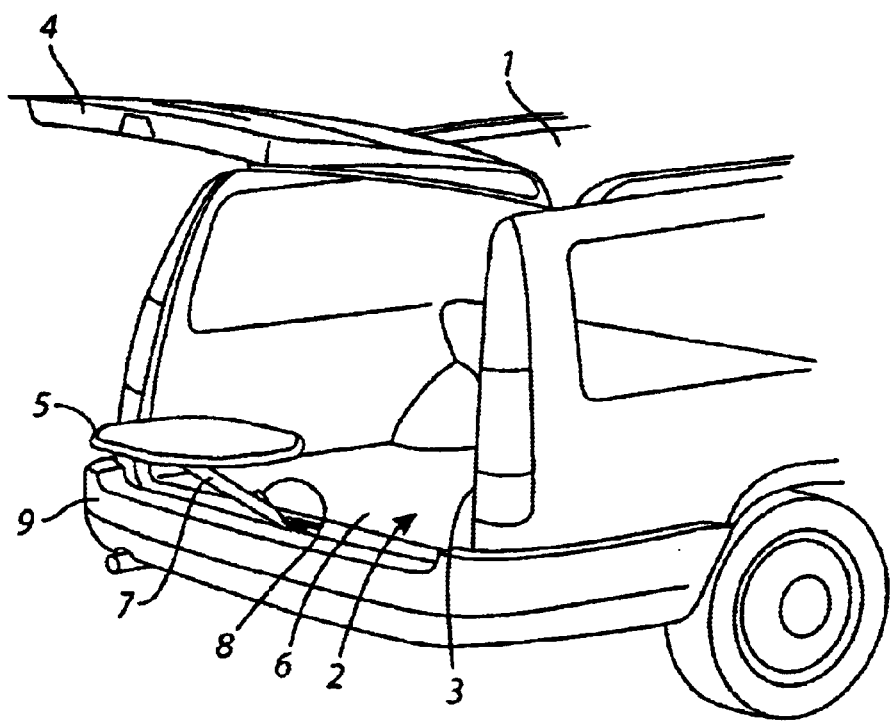
FIG. 1 is a perspective view of the rear part of a motor vehicle, from which the construction and function of the invention is made clear.

FIG. 1 shows a perspective view obliquely from behind of a motor vehicle 1 at which the invention may be used. The vehicle 1 suitably consists of a car of the estate car type, which is a kind of vehicle that comprises a passenger compartment that is designed to be integrated with a relatively large rear trunk 2. However, the invention is not limited to be used with estate cars, but can be used for all kinds of vehicles where there is a desire to use a detachable table as for example a serving table or work bench.

In a conventional manner, the vehicle 1 is designed with an opening 3 to a rear boot 2, which opening 2 may be closed by means of a pivoted suspended boot lid 4. The vehicle 1 according to FIG. 1 is of the kind that has a boot lid 4 that can be pivoted around a principally horizontal axis in the upper part of the vehicle, but the invention may also be used for those types of vehicles that includes one or two doors that are opened and pivoted around vertical pivot axis at the respective sides of the vehicle. The invention can also be used for the type of vehicle that includes a two-piece boot lid, where a first part of the lid is pivoted around a horizontal axis at the upper part of the vehicle and a second part of the lid is pivoted around an additional horizontal axis at the lower part of the vehicle.

According to a first embodiment, the invention is arranged for detachable mounting of a table 5, shown as a conventional table top, with reference to the opening 3. The table 5 is then suitably arranged to protrude a little bit behind the car 1, and also be arranged at a predetermined height in order to use the table as a serving table. For example, one or more persons may then use the rear part of the floor 6 of the boot 2 as a seat. Chairs (not shown) may also be placed around the table 5 when it is in use.

The table 5 is arranged to be attachable mounted at a certain support element in the shape of a fastening leg 7, which in its turn is arranged to be locked to the floor 6. In a way that will be described in detail below, but is not evident in detail from FIG. 1, the leg 7 is equipped with a first locking element 8 which in its turn is arranged for locking to a second locking element in the vehicle 1. More precisely the first locking element consists of a pivoting rod 8 with an end part similar to a hook (does not show in FIG. 1). This end part is in its turn arranged for being brought through and locked to a second locking element that preferably consists of a shackle arranged to be normally available used for locking the trunk lid 4 when closing the trunk 2. The shackle is arranged at the floor 6, in close connection to a bumper 9 belonging to the vehicle. Further, the leg 7 is preferably manufactured from metal, preferably aluminum.

Figure 2:
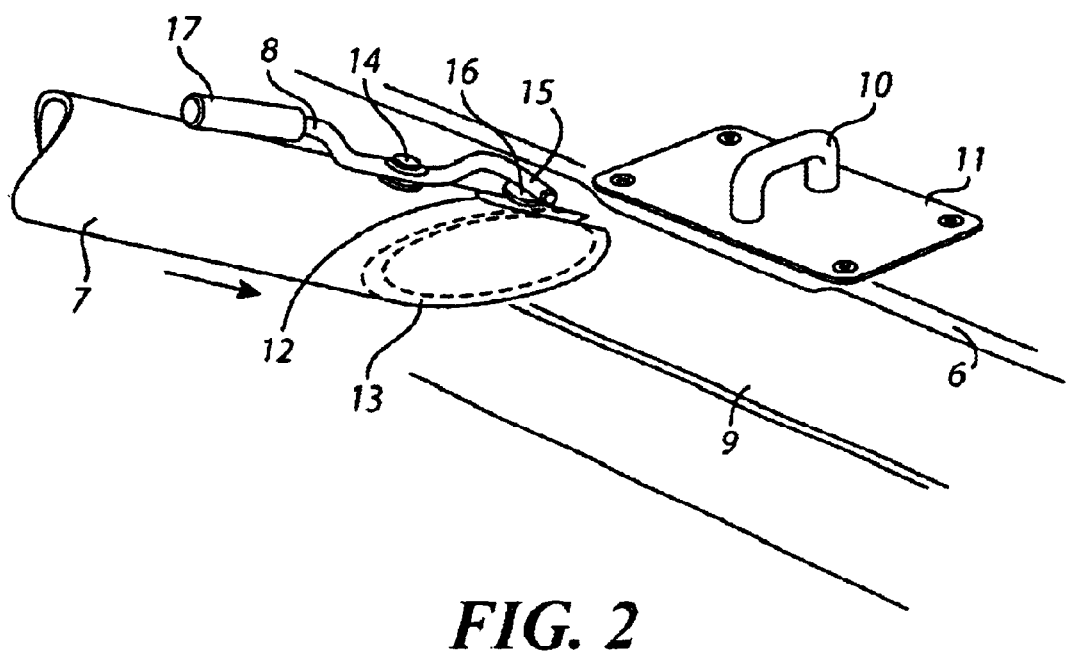
FIG. 2 is a perspective view which in a first position shows how the invention can be mounted and locked to a vehicle.

In FIG. 2, a slightly enlarged perspective view of how the fastening of the leg 7 is done in the vehicle 1 is shown. In FIG. 2, the floor 6 in the trunk of the vehicle 1, and the bumper 9 that constitutes an ending of this trunk is also evident. In the figure the lower part of the leg 7 is shown, but not the table itself, which is fastened in the upper part of the leg 7 in a way that will be described in detail below.

It shall be noted that FIG. 2 shows the invention in a state where the leg 7 not yet has been locked to the vehicle 1. According to a preferred embodiment, the invention takes advantage of the fact that the vehicle 1 is provided with a locking element in the form of a shackle 11 that is firmly connected to a flat-looking element 11, which in its turn is anchored to the floor 6. This type of shackle 10 is normally standard mounted in most vehicles of the estate car type, and is then used for locking the boot lid (see FIG. 1). The shackle 10 is principally shaped as an up-side-down U, i.e., with the rods of the U facing and anchored to the plate 11. The shackle 10 is also aligned along an imaginary plane with an extension mainly in the longitudinal direction of the vehicle.

According to what is evident from FIG. 2, the leg 7 is principally tubular, preferably with a circular cross-section, and is provided with a slot 12 with its main extension principally in the longitudinal direction of the leg 7. The slot 12 is designed according to the outer dimensions of the shackle 10 to make it fit in place during mounting of the leg 7 by fitting the shackle 10 in the slot 12. The edge part of the leg 7 facing the vehicle is also designed with an oblique planar end surface 13 that is somewhat angled in relation to the longitudinal direction of the leg 7. In that way the end part of the leg 7 is adapted to the surface in the vehicle against which it is to bear on. The end surface 13 is shown with dashed lines in FIG. 2.

According to what is said above, the leg 7 carries a locking element in the shape of a locking arm 8, which is pivoted in the leg 7 around an axle bar 14. The locking arm 8 includes, as mentioned above, a part mainly shaped similar to a hook 15, which is intended to engage the opening defined by the shackle 10 when locking the leg 7. At the hook-shaped part 15 a protrusion 16 is suitably arranged, further contributing to the retaining and force absorbing function of the locking arm 8 when locking the leg 7. The locking arm 8 is also provided with a handle 17 to facilitate manual handling of the locking arm 8.

FIG. 2 shows the invention in a position just before the leg 7 has been brought into place and the locking arm 8 has been locked, i.e., when the leg 7 is being brought in the direction indicated with an arrow in the figure. In this position, the locking arm 8 is pivoted to a position with an extension in a certain angle, for example, about 45 degrees, in relation to the longitudinal direction of the leg 7, in order to facilitate the locking when the hook-shaped part 15 is brought into the shackle 10.

Figure 3:
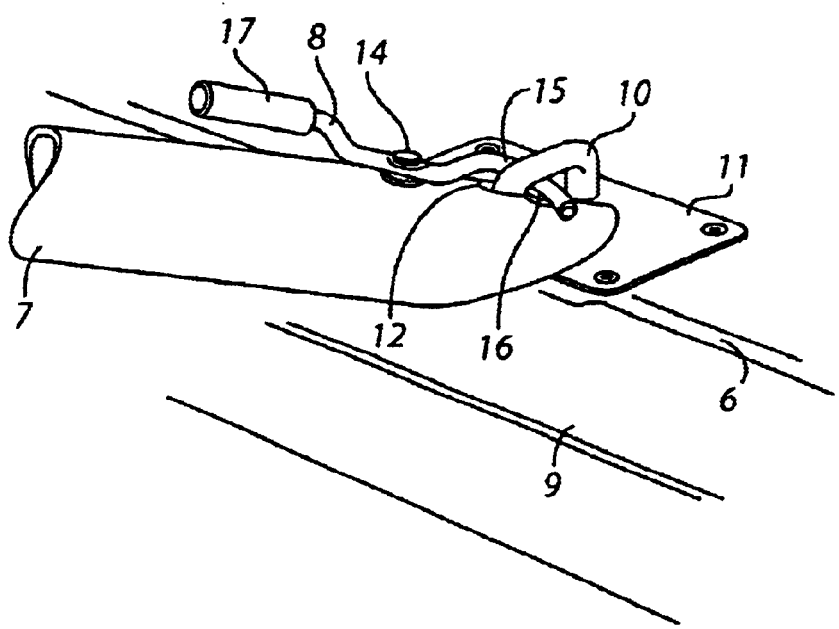
FIG. 3 is a perspective view which in a second position shows how the invention can be mounted and locked to a vehicle.

In FIG. 3 the arrangement according to the invention is shown in a condition in which the leg 7 is locked to the vehicle, i.e., the same condition as shown in FIG. 1. In this position the leg 7 is locked in relation to the shackle 10, when it has been seen to that the slot 12 is aligned with the plane along which the shackle 10 is arranged. Moreover the locking arm 8 has been manually pivoted towards the shackle 10 making the hook-shaped part 15 engage the shackle 10. More exactly the end part of the hook-shaped part 15 has then been brought through the opening of the shackle 10 making at least some part along the hook-shaped part bear on and be pressed towards a corresponding part of the inside of the shackle 10. For this purpose the protrusion 16 is also used, which then bears on the inside of the shackle 10.

To sum up, a firm lock of the leg 7 is acquired by the engagement of the hook-shaped part 15 that is used to absorb mainly vertical forces as well as forces in the longitudinal direction of the leg 7.

When dismantling the leg 7 the reverse procedure is carried out, i.e., the locking arm 8 is pivoted from its engagement with the shackle 10, after which the leg 7 can be loosened.

Figure 4:
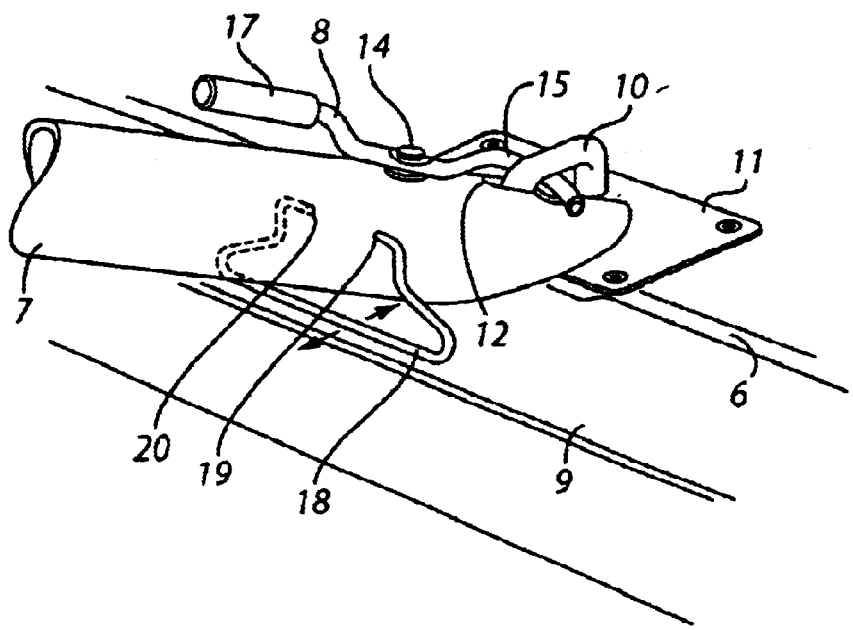
FIG. 4 is a perspective view showing a possible variant of the invention, in the second position.

In FIG. 4, the arrangement according to the invention is shown in an alternative embodiment which mainly corresponds to what is shown in FIG. 3, but where the leg 7 has been supplemented with a special supporting element mainly shaped as an open clamp 18 which respective end parts are fastened to the leg, more precisely in two holes, 19 and 20 respectively, in the leg 7. The clamp 18 may then be used as a supporting leg which at use is arranged at the leg in such a way that its lower part rests against he bumper 9. The clamp 18 may be pivoted around the imagined axis defined by the holes 19, 20, in what way the resting point against the bumper 9 can be adjusted in the longitudinal direction of the vehicle, as indicated with arrows in FIG. 4. When the leg 7 is mounted and the clamp 18 has been adjusted to an appropriate position, a restraining force is thus provided which is needed for a firm placement of the leg 7 without any tendencies for play. Normally the clamp 18 is arranged along a plane with a principally vertical extension.

Figure 5:
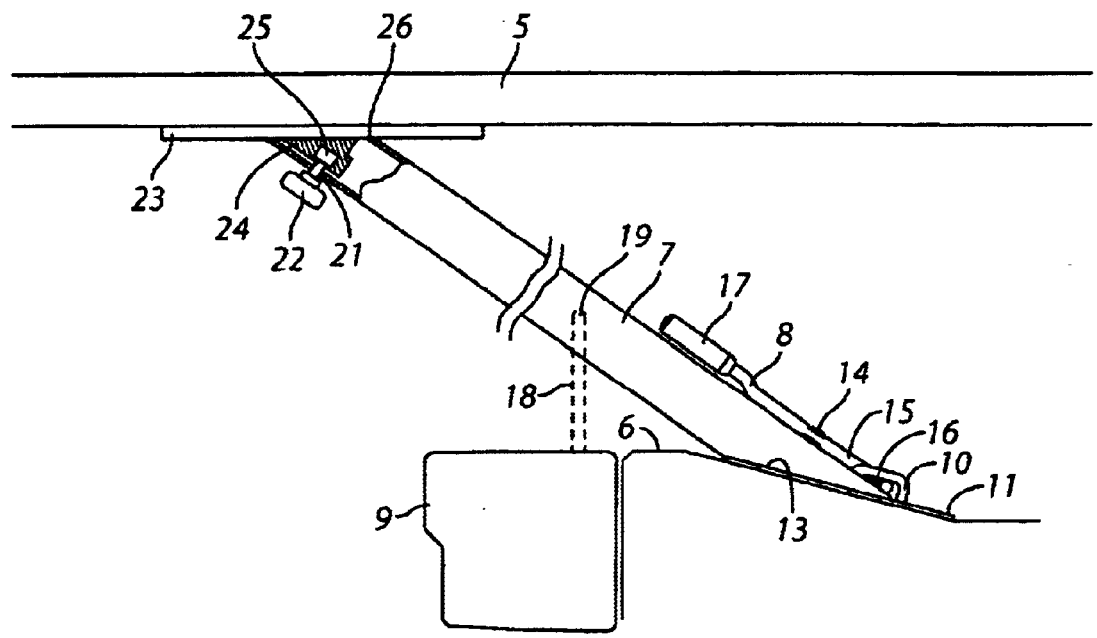
FIG. 5 is a side view corresponding to the second position, i.e., what is shown in FIGS. 3 and 4.

In FIG. 5 a side view of the arrangement according to the invention is shown. The figure is partly broken up with the intention to describe the fastening of the leg 7 to the table 5. According to what has been mentioned above, the leg 7 is designed in such a way that the lower part facing the vehicle constitutes an oblique surface 13. In the locked state of the leg 7 the surface 13 will rest against a corresponding surface at the vehicle, more precisely the surface that is defined by the upper side of the plate 11 in which the clamp 10 is fastened. Thus a stable fastening of the table 5 is acquired which then endures a relatively high load without giving way or be experienced as wobbly and unstable.

FIG. 5 discloses how the hook-shaped part 15 has been inserted and locked to the shackle 10. Thus, a partial contact exists between the periphery of the hook-shaped part 15 and the inside of he shackle 10. The protrusion 16 also bears on the inside of the shackle 10, which further strengthens the load-absorbing ability at the locking arm 8.

Further the above-mentioned clamp 18 is drawn in FIG. 5 with dashed lines. Thus it is obvious that in the case where the clamp 18 is used, its lower part will rest against the bumper 9 when in use. The figure also discloses that the clamp 18 normally is arranged mainly vertically.

Further FIG. 5 discloses that the table 5 is fastened to the upper end part of the leg 7 (see FIG. 1). For this purpose the leg is designed with a hole 21 in which a locking screw 22 is mounted. This locking screw 22 is in its turn intended to cooperate with a mounting plate 23 mounted in the table 5 during manual tightening, which in its turn is provided with raised longitudinal part 24 that is designed with a longitudinal slot 25. The slot 25 is then arranged with an extension mainly perpendicular to the longitudinal direction of the leg 7. Further, the locking screw 22 is arranged to be displaced together with the leg 7 along the slot 25, i.e. in relation to the table otherwise. Thus the table 5 may be put in a suitable lateral position in relation to the leg 7.

The mounting plate 23 is permanently arranged on the lower side of the table 5, preferably with the help of (not shown) double-stick tape that has been applied between the mounting plate 23 and the table 5.

The edge part of the leg 7 which faces the lower side of the table 5 is designed with a cut off edge part, where one more oblique edge surface 26 is defined. This edge surface 26 is then intended to bear on the mounting plate 23.

Figure 6:
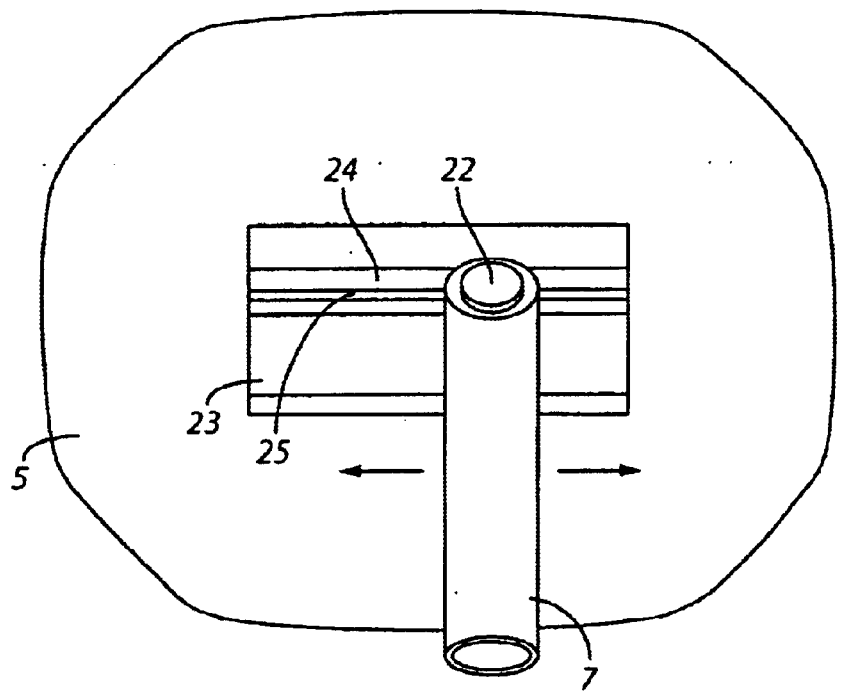
FIG. 6 is a perspective view showing how a table and a supporting element according to the invention may be joined together.

FIG. 6 is a perspective view from the underside of the table 5, from which it is evident how the leg 7 is fastened to the mounting plate and how the leg 7 can be locked to a suitable lateral position in relation to the table 5. In FIG. 5 only one of the edge parts of the leg 7 is shown, and not the locking arm (see FIGS. 2 and 3) and the fastening of the leg 7 to the current vehicle. During mounting of the arrangement according to the invention the leg 7 is first positioned against the underside of the table 5, more precisely permitting the edge part 26 of the leg 7 (see FIG. 5) to bear on the mounting plate 23. During mounting it is simultaneously seen to that the leg 7 is positioned in desired position along the slot 25, according to what is indicated with arrows in FIG. 6.

When the leg 7 has been placed in desired position the lock screw 22 is tightened, locking the leg 7 to the protruding part 24 of the mounting plate 23 in the adjusted position. Afterwards the lower part of the leg 7 may suitably be locked to the vehicle, according to what has been described above referring to FIGS. 2 and 3.

The arrangement according to the invention can easily be dismantled and then comprises two essential components, namely the leg 7 (with belonging lock screw 22 and locking arm 8) and the table 5. These parts are easily stowed in an available space beneath the floor in the boot of the vehicle.

Figure 7:
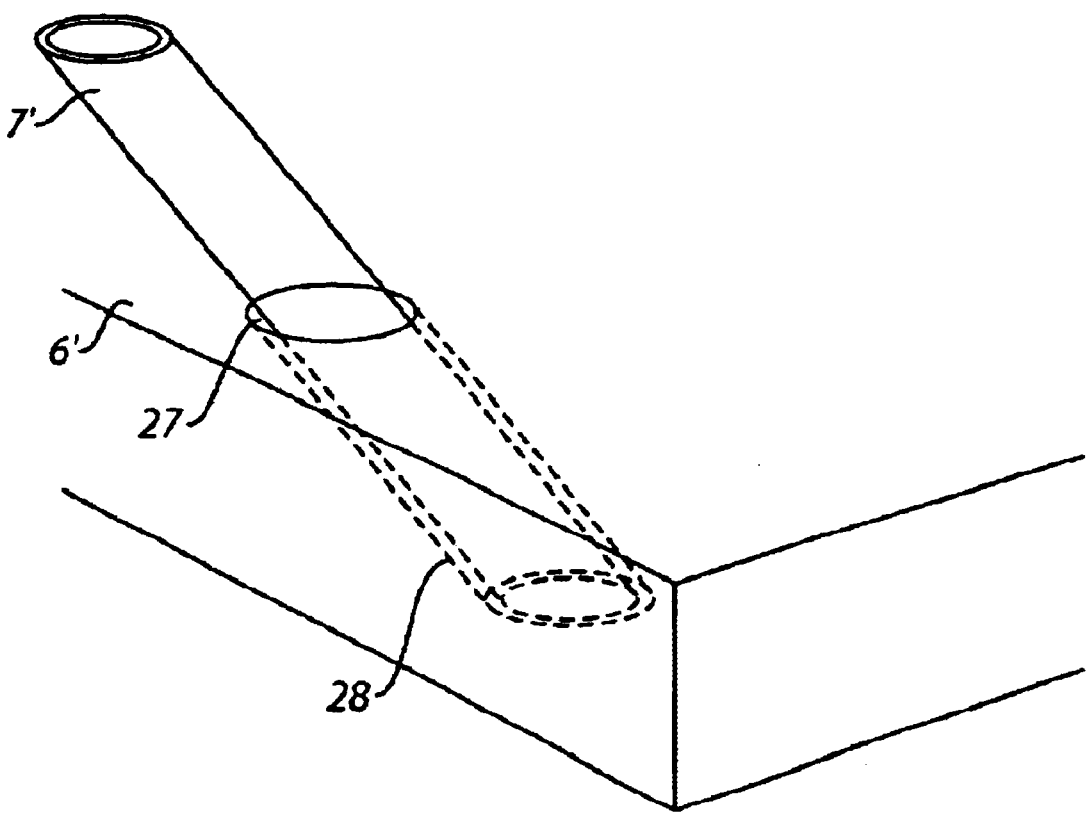
FIG. 7 is a perspective view showing an additional embodiment of the invention.

In FIG. 7, another embodiment of the invention is shown, which principally corresponds to what has been explained above, but where the second lock element, i.e. the lock element arranged in the vehicle, consists of an inset or casing 27 arranged in the vehicle, preferably in a floor 6' in a rear boot. Alternatively, the casing 27 may be arranged in a (not shown) shock absorber. This embodiment is especially suited for the vehicles where the thickness of the floor 6' permits hollowing out such a case of sufficient depth.

According to this embodiment, a supporting element in the shape of a leg 7' can be mounted by being pushed down into the casing 27. For this purpose the leg 7 is designed with its lower edge part 28 to constitute a lock element by being designed with an outer diameter which is slightly less than the inner diameter of the casing 27.

Consequently, at this embodiment the locking arm that has been described above is not necessary. The embodiment can, however, be supplemented with some form (not shown) of split pin or locking mechanism to prevent that the leg 7' moves in the casing 27.

This alternate embodiment is suitable also when the current vehicle for example has two rear doors that are opened along a principally vertical axis, or if the vehicle comprises a two-piece boot lid, where a first part of the lid is pivoted around a horizontal axis at the upper part of the vehicle and a second part of the lid is pivoted around an additional horizontal axis at the lower part of the vehicle. In such cases the casing 27 may be arranged in one of the doors or, alternatively, one of the lid parts.

The invention is not limited to the above described and on the drawings shown embodiments, but can be varied within the scope of the appended patent claims. For example, the invention may be used for cars, mini-buses and other vehicles where there is a need for a detachable table. Further the invention may be used with or without the supporting leg 18 described above. The supporting leg 18 can in itself be designed with or without the curved inwards "waist" which is disclosed in FIG. 4. In its simplest form the supporting leg 18 can be designed as a principally straight leg which is folding out from the mounting leg 7.

Further, the table in itself can be designed in several different ways, for example as a smaller serving table for food and beverages, as a work or drawing surface, as a work bench for by way of example ski waxing or as a supporting arrangement or holder for by way of example a computer screen, a bicycle or some other object.

Further the above-mentioned leg can be designed in different ways, for example with a circular or a square cross-section.

In order to admit settings of different positions for the table the leg described above can be designed with two or more telescopically arranged sections that in a known way may be displaced in relation to each other and be locked in a desired position, for example in order to alter the height of the table.

The table can rest on a carrying element in the shape of a single leg, as explained above, or by other arrangements, for example two or more legs locked together with a locking element of their own of the same kind as the above-mentioned locking arm.

The locking element available in the vehicle can be an existing shackle, or alternatively consist of another form of locking element allowing connection to the leg. The locking element arranged in the car may also be positioned at a rear boot, or alternatively at some side door of the vehicle.

The locking arm 8 described above may be supplied with some form of catch or similar, to prevent that the hook-shaped part unintentionally is brought out of engagement with the shackle when the arrangement is in its assembled state. In the regular case no such additional locking devices are necessary.

What is claim is:

1. An arrangement for detachable mounting of a table to a vehicle, the arrangement comprising:

a supporting element arranged for locking to said table, and a first locking element arranged in the supporting element for locking the supporting element to the vehicle, wherein the supporting element by means of the first locking element is arranged for being detachably locked to a second locking element designed in the vehicle such that the supporting element and the first locking element solely carries said table.

2. The arrangement according to claim 1, the supporting element further comprising a shackle available in the vehicle used for locking of a door or lid belonging to the vehicle.

3. The arrangement according to claim 2 the vehicle is of the estate car type, and wherein the shackle is arranged for locking a lid to a trunk in the vehicle.

4. The arrangement according to claim 1, the second locking element is substantially U-shaped, with the opening of the U facing a mounting point in the vehicle.

5. The arrangement according to claim 1, supporting element further comprising a tubular leg detachably lockable between the table and the vehicle.

6. The arrangement according to claim 5, wherein the end part of said leg that is facing the vehicle is designed with a slot extending principally in the longitudinal direction of the leg, which slot is designed to cooperate with said second locking element.

7. The arrangement according to claim 5, wherein the end part of said leg that is facing the vehicle is designed for bearing on a correspondingly designed surface in the vehicle.

8. The arrangement according to claim 1, the first locking element further comprising a locking arm that is fastened and pivotable in relation to the supporting element.

9. The arrangement according to claim 8, the locking arm further comprising a hook-shaped part that is designed to fix the position of the locking arm in relation to the second locking element.

10. The arrangement according to claim 8, wherein the hook-shaped part is designed for said fix of position by being brought into an opening designed in the second locking element.

11. The arrangement according to claim 1, second locking element further comprising a casing arranged in the vehicle, and said first locking element further comprises a portion of the supporting element facing the vehicle, which is designed with outer dimensions slightly less than the inner dimensions of the casing.

12. The arrangement according to claim 1, wherein the supporting element is displaceably fastened to the table, by which the position of the table in relation to the supporting element can be adjusted.

13. The arrangement according to claim 1, supporting element further comprising a resting element pivotable in relation to the supporting element and arranged for bearing on a surface in said vehicle.

* * * * *

UNITED STATES PATENT AND TRADEMARK OFFICE
CERTIFICATE OF CORRECTION

PATENT NO. : 6,722,290 B2
DATED : April 20, 2004
INVENTOR(S) : Ulf Wetterlund

It is certified that error appears in the above-identified patent and that said Letters Patent is hereby corrected as shown below:

Title page,
Item [73], Assignee, delete "Gothenburg" and insert -- Göteborg --;

Signed and Sealed this

Twenty-eighth Day of December, 2004

JON W. DUDAS
*Director of the United States Patent and Trademark Office*